(12) United States Patent
Niederoest et al.

(10) Patent No.: US 12,215,271 B2
(45) Date of Patent: Feb. 4, 2025

(54) COOLING SUPPORT CUSHION AND RELATED METHODS

(71) Applicant: Tempur World, LLC, Lexington, KY (US)

(72) Inventors: Beat Niederoest, West Berlin, NJ (US); Michael Mozeika, West Berlin, NJ (US); Tony Turoso, Lexington, KY (US); Stephen Wallace, Lexington, KY (US)

(73) Assignee: TEMPUR WORLD, LLC, Lexington, KY (US)

( * ) Notice: Subject to any disclaimer, the term of this patent is extended or adjusted under 35 U.S.C. 154(b) by 0 days.

(21) Appl. No.: 18/481,569

(22) Filed: Oct. 5, 2023

(65) Prior Publication Data

US 2024/0026201 A1 Jan. 25, 2024

Related U.S. Application Data (63) Continuation of application No. 16/611,139, filed as application No. PCT/US2018/031406 on May 7, 2018, now Pat. No. 11,807,799.

(51) Int. Cl.
| | |
|---|---|
| *C09K 5/06* | (2006.01) |
| *C08G 18/76* | (2006.01) |
| *C09D 5/26* | (2006.01) |
| *C09D 175/04* | (2006.01) |
| *B05D 1/02* | (2006.01) |

(52) U.S. Cl.
CPC .......... *C09K 5/066* (2013.01); *C08G 18/7671* (2013.01); *C09D 5/26* (2013.01); *C09D 175/04* (2013.01); *B05D 1/02* (2013.01)

(58) Field of Classification Search
CPC .......... C09K 5/066; C09K 5/06; C09K 5/063; C08G 18/7671; C08G 18/40; C08G 2220/00; C08G 2350/00; C09D 5/26; C09D 175/04; B05D 1/02; B05D 1/34; B05D 1/36; B05D 7/5423; B05D 7/5483; B05D 2503/00; B05D 5/00; B05D 7/24; B05D 3/12

See application file for complete search history.

(56) References Cited

U.S. PATENT DOCUMENTS

| | | | | |
|---|---|---|---|---|
| 5,677,048 | A * | 10/1997 | Pushaw | C08J 9/42 428/323 |
| 8,232,364 | B2 * | 7/2012 | Hoffman | C08G 18/227 528/81 |
| 10,813,469 | B2 * | 10/2020 | Turoso | B68G 7/05 |
| 2003/0088019 | A1 * | 5/2003 | Pause | A43B 7/34 524/487 |
| 2004/0234726 | A1 * | 11/2004 | Pause | C08K 5/0008 428/423.1 |
| 2010/0015430 | A1 * | 1/2010 | Hartmann | B32B 27/08 428/323 |
| 2013/0296449 | A1 * | 11/2013 | Peterson | C08J 9/0009 521/137 |
| 2014/0141233 | A1 * | 5/2014 | Crawford | C08K 5/01 5/636 |
| 2015/0351557 | A1 * | 12/2015 | Allen | A47C 27/085 5/652 |
| 2017/0210961 | A1 * | 7/2017 | Mason | C08G 18/227 |
| 2021/0161301 | A1 * | 6/2021 | Smiderle | A47C 21/06 |

* cited by examiner

*Primary Examiner* — Jane L Stanley
(74) *Attorney, Agent, or Firm* — Stites & Harbison, PLLC; Terry L. Wright (57) ABSTRACT

A cooling support cushion (10) and method of forming same is provided. In particular, the present cooling support cushions and methods of producing the same make use of a plurality of surface coatings (32) to a base layer (20) to provide an extended cooling effect. The surface coating may be mixed and applied or may be applied as separated layers.

15 Claims, 4 Drawing Sheets

COOLING SUPPORT CUSHION AND RELATED METHODS

CLAIM TO PRIORITY

This application is a continuation application of U.S. patent application Ser. No. 16/611,139, which is a 35 U.S.C. § 371 National Stage Patent Application claiming priority to International Patent Application No. PCT/US2018/031406, filed May 7, 2018, and claiming priority to and the benefit of, under 35 U.S.C. § 119(e), U.S. Provisional Patent Application Ser. No. 62/503,058, filed May 8, 2017, all of which are incorporated herein by reference.

TECHNICAL FIELD

The present embodiments relate to cooling support cushions and methods of producing the same. In particular, the present embodiments relate to cooling support cushions and methods of producing the same that make use of a surface coating to provide an extended cooling effect.

BACKGROUND

The effectiveness and desirability of a support cushion is partly a function of how comfortable a user is on the support cushion over an extended period of time. In this regard, many users find support cushions, and in particular mattresses, which are made of a viscoelastic foam to be uncomfortably warm after an extended period of time. One solution to this problem is the inclusion of phase change materials that absorb heat as they change from a solid to a liquid phase, i.e., melt. These phase change materials, however, typically only cool for a short span of time. Additionally, application of these phase change materials may involves multiple steps, which can increase cost.

Accordingly, there remains a need in the art for a support cushion that provides an extended cooling experience, and an efficient method for forming such support cushions.

SUMMARY

The present embodiments include cooling support cushions and methods of producing the same. In particular, the present embodiments include cooling support cushions and methods of producing the same that make use of a plurality of surface coatings to provide an extended cooling effect.

In some embodiments, a support cushion is provided that includes a base layer having a lower surface and an upper surface, and a surface coating positioned atop the upper surface of the base layer. The surface coating includes a phase change material (such as for non-limiting example phase change slurry) and a gel, is configured to allow an amount of air to flow through the base layer and the plurality of surface coatings, and is further configured to provide a cooling effect. In one embodiment, the base layer is a flexible foam. In another embodiment, the surface coating includes, by weight, 80-90% phase change material (or phase change slurry) and 10-20% gel. In another further embodiment, the phase change slurry includes the composition shown in Table B. Additionally or alternatively, the gel is a 2K polyurethane gel, such as the 2K polyurethane gel having the composition shown in Table C.

In some embodiments, the surface coating has a thickness of less than about 5 mm. In one embodiment, the phase change material is configured to undergo a phase change at a temperature of about 20° C. to about 36° C.

In some embodiments, a method of producing a support cushion includes the steps of providing a base layer having a lower surface and an upper surface, providing a phase change material (for example slurry) and a gel, mixing the phase change material and the gel to form a combined system, and applying the combined system to the upper surface of the base layer to form a surface coating, the surface coating being configured to allow an amount of air to flow through the base layer and the surface coating and further configured to provide a cooling effect. In one embodiment, the step of applying the combined system comprises spray applying the combined system. In another embodiment, the mixing of the phase change material and the gel is performed in situ.

Further features and advantages of the present embodiments will become evident to those of ordinary skill in the art after a study of the description, figures, and non-limiting examples in this document.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as is commonly understood by one of skill in the art to which the embodiment(s) belong. All patents, patent applications, published applications and publications, databases, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a layer" includes a plurality of such layers, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The present embodiment includes cooling support cushions and methods of producing the same. In particular, the present embodiment includes cooling support cushions and methods of producing the same that make use of a plurality of surface coatings to provide an extended cooling effect.

Figure 1:
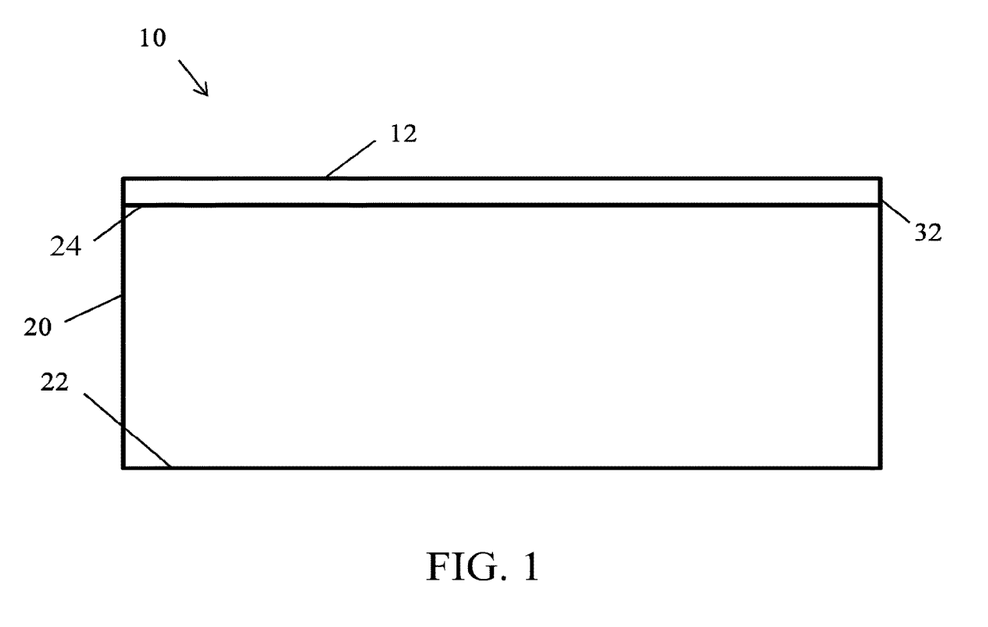
FIG. 1 is a side view of a support cushion in the form of a mattress and made in accordance with the present embodiments.

Referring first to FIG. 1, in one exemplary embodiment, a support cushion 10 in the form of a mattress and having a support surface 12 is provided. The support cushion 10 includes a base layer 20 having a lower surface 22 and an upper surface 24. The term base layer refers to a layer which defines a base or substrate upon which a surface coating may be applied. The term may include a lower layer but is not limited to a lower layer according to some interpretations of the term base. For example, the base layer 20 may be defined by a single foam layer, or a multiple layer laminate. Where multiple foam layers are utilized, the base layer may be defined by an upper layer, lower layer, or an intermediate layer therebetween. The support cushion 10 also includes a surface coating 32 applied to the base layer 20 to provide a cooling effect at the support surface 12 of the support cushion 10 and that is configured to allow air to flow through both the surface coating 32 and the base layer 20.

The base layer 20 of the support cushion is generally comprised of a flexible foam that is capable of suitably distributing pressure from a user's body or portion thereof across the support cushion 10. Various flexible foams can be used in this regard including, but not limited to, latex foam, reticulated or non-reticulated visco-elastic foam (sometimes referred to as memory foam or low-resilience foam), reticulated or non-reticulated non-visco-elastic foam, polyurethane high-resilience foam, expanded polymer foams (e.g., expanded ethylene vinyl acetate, polypropylene, polystyrene, or polyethylene), and the like, but in any case, the flexible foam used in the base layer 20 of the support cushion 10 is porous and typically allows an amount of air to flow through the base layer of the support cushion 10. Moreover, although the base layer 20 of the support cushion 10 shown in FIG. 1 is shown as being comprised of a single layer of foam, it is further appreciated that a base layer of an exemplary support cushion of the present embodiments can be comprised of multiple layers of foam having varying or the same densities or hardness values.

According to some embodiments, the base layer 20 may be made of visco-elastic foam, i.e., foam which is both viscous in order to conform under pressure, and elastic in order to return to its uncompressed state. Visco-elastic foam is sensitive to body heat such that the material conforms to the user's body, providing a more comfortable sleep surface.

In some exemplary embodiments, the flexible foam comprising the base layer 20 is comprised of a visco-elastic polyurethane foam having a hardness of at least about 10 N to no greater than about 80 N, as measured by exerting pressure from a plate against a sample of the material to a compression of at least 40% of an original thickness of the material at approximately room temperature (i.e., 21° C. to 23° C.), where the 40% compression is held for a set period of time as established by the International Organization of Standardization (ISO) 2439 hardness measuring standard. In some embodiments, the visco-elastic foam comprising the base layer 20 has a hardness of about 10 N, about 20 N, about 30 N, about 40 N, about 50 N, about 60 N, about 70 N, or about 80 N to provide a desired degree of comfort and body-conforming qualities.

The visco-elastic foam described herein for use in the base layer 20 of the support cushion 10 can also have a density that assists in providing a desired degree of comfort and body-conforming qualities, as well as an increased degree of material durability. In some embodiments, the density of the visco-elastic foam used in the base layer 20 has a density of no less than about 30 kg/m$^3$ to no greater than about 150 kg/m$^3$. In some embodiments, the density of the visco-elastic foam used in the base layer of the support cushion is about 30 kg/m$^3$, about 40 kg/m$^3$, about 50 kg/m$^3$, about 60 kg/m$^3$, about 70 kg/m$^3$, about 80 kg/m$^3$, about 90 kg/m$^3$, about 100 kg/m$^3$, about 110 kg/m$^3$, about 120 kg/m$^3$, about 130 kg/m$^3$, about 140 kg/m$^3$, or about 150 kg/m$^3$. Of course, the selection of a visco-elastic foam having a particular density will affect other characteristics of the foam, including its hardness, the manner in which the foam responds to pressure, and the overall feel of the foam, but it is appreciated that a visco-elastic foam having a desired density and hardness can readily be selected for an exemplary support cushion or for a particular application as desired.

Other foams may be used as well in some embodiments, for example, solid foams, including closed cell and open cell (reticulated) structures, provide lightweight cellular engineering materials for weight bearing and distribution (pressure distribution) and energy absorption. In general, open-cell-structured foams have pores that are interconnected in a network. The interstitial spaces of open-cell foams can be filled with gas, liquid or solid material. The density of foam is determined in part by both the amount of structural material which forms the cells, such as polyurethane, polyethylene or latex, and the volume or size of the cells.

Closed-cell foams generally do not have interconnected pores, generally have relatively higher compressive strength due to the closed cell bubble structures, and are relatively denser. The closed-cell structure foams have higher dimensional stability, low moisture absorption coefficients, and higher strength compared to open-cell-structured foams. The closed cells can be filled with gases to provide improved insulation, or with other materials to alter the physical properties of the foam. All types of foam have been widely used as core material in sandwich structure composite materials.

Still further, other types of foams may be used as well. In some non-limiting examples, special classes of closed-cell foams known as syntactic foam may be used which contains hollow particles embedded in a matrix material. The particles can be made from several materials, including but not limited to, glass, ceramic, and polymers. The advantage of syntactic foams is that they have a very high strength-to-weight ratio, making them ideal materials for many applications. One particular syntactic foam uses shape memory polymer which enables the foam to take on the characteristics of shape memory resins and composite materials with hysteresis properties which enable it to be reshaped repeatedly when heated above a certain temperature and cooled.

Further, in some embodiments a multiple layer cushions may be formed wherein the base layer may be formed of two or more layers. Multiple layer foam mattresses come in a variety of forms as to the type of material of each layer, the thickness of each layer and the density of each layer can be varied to provide a mattress with different support characteristics. For non-limiting example, in some embodiments, the cushion may be formed of a top layer defined by open-celled non-reticulated visco-elastic foam and the bottom layer may be a reticulated non-visco-elastic foam. The top and bottom layers may also be referred to as comfort and support layers, respectively according to some embodiments.

Still further, these comfort and support layers may each be defined by one or more layers. Further for example, each of the top and bottom layers can be substantially flat bodies having substantially planar top and bottom surfaces. However, in other embodiments, one or more of the top and bottom surfaces of either or both top and bottom layers can also be non-planar, including without limitation, surfaces having ribs, bumps, and other protrusions of any shape and size, surfaces having grooves, dimples, and other apertures that extend partially through, nearly completely or entirely through the respective layers and the like. Also, depending at least in part upon the application of the cushion either or both of the top and bottom layers can have shapes that are not flat. By way of example only, either or both layers can be generally wedge-shaped, can have a concave or convex cross-sectional shape, can have a combination of convex and concave shapes, can have a stepped, faceted, or other shape, can have a complex or irregular shape, and/or can have any other shape desired. Such shapes may for example be associated with various of the non-limiting types of cushions described herein. Additionally, one skilled in the art should understand that a base layer 20 of a single foam layer may also have any of these characteristics.

Further according to some embodiments, while some layers may be of the same or similar type of foam, other embodiments may provide different type of foams to define the layers. For example, as mentioned previously a top layer may be formed of non-reticulated visco-elastic foam, a bottom layer may be formed of a reticulated foam, such as a reticulated non-visco-elastic. The lower level may be less responsive or less sensitive to temperature changes and when combined with a corrugated surface, may provide for some cooling airflow between an adjacent surface of an adjacent layer.

Where multiple layers are being used, the layers may be joined in a plurality of ways. For example, the layers may be sprayed-on, injection molded, extruded, coextruded, laminated, and the like. In several embodiments, layers may be stapled, tacked, welded, laminated, mechanically affixed via friction or interference fit, adhered via an adhesive, a glue, a cement, or other material with adhesive properties, stitched, affixed via hook and loop fastener, a zipper, a Dennison-style tag, snaps, and/or other reversible means, and combinations thereof. For purposes of present embodiments, various layers may be joined with adhesives including glues, cements and other materials with adhesive properties. Adhesives that may be used in the present disclosure include any adherent materials or fasteners known in the art. Specific examples of adhesives include, but are not limited to, hot melt, water-based, and pressure-sensitive adhesives, fire-resistant adhesives, and mixtures thereof. Further, a layer and/or an adhesive may further include a silica, a metallic layer, a plastic, such as an acrylic, a modacrylic, a polyolefin, a latex, a polyurethane, and combinations and/or blends thereof. In addition, a layer may further include biocides, preservatives, odor blocking agents, scents, pigments, dyes, stain guards, antistatic agents, anti-soiling agents, water-proofing agents, moisture wicking agents, and the like, as are known in the art.

The base layer 20 or multiple layers defining the base layer 20, may also vary in thickness. The base layer 20 may also define a core which may be defined by any of the following non-limiting examples of foams a gel infused foam, gel memory foam, a multi-gel foam, a high thermal conductivity foam. According any of these types may be used to define the support foam, which may include the core, or may be used for the comfort layer. The core may also include foams having springs therein (innercoil springs) or alternatively may have pocketed coils.

Still further, other materials may be used to define the base layer including but not limited to a gel pad, a woven layer, a nonwoven layer, a fire-resistant layer, a non-skid layer, and combinations thereof. Further it should be clear that since the base layer may be defined by various layers or combinations of layer, the base layer 20 may also be defined by a topper material. Additionally, a cover material may be used as an outermost surface material for the cushion. In such instance, and in accordance with these teachings, the outer cover may also include a surface coating.

Regardless of the particular foam type (s), number of layers, density, and hardness values of a base layer 20, in some embodiments, the surface coating 32 applied to the upper surface 24 of the base layer 20. The surface coating 32 is applied to the foam base layer 20 of the support cushions to create cool feeling on the user's skin. The surface coating may be applied in a mixed form or may be applied in individual layers. The surface coating 32 may include two or more components if delivered in a mixed form or two or more layers if applied individually. The surface coating 32 may be applied in various manners including but not limited to roller, spray and the application may be applied as individual layers or premixed before being applied, such as mixed before passing through an application nozzle. The surface coating 32 may include a phase change material (PCM). In some embodiments, the phase change material is microencapsulated. In some further embodiments, the microencapsulated material is introduced in a blend with other components. For example, in one embodiment, the PCM utilized in the surface coating 32 is in the form of a PCM slurry, or otherwise thought of as a PCM containing slurry or coating. The PCM slurry may include, for nonlimiting example, about 20-70% microencapsulated PCM; about 30-80% acrylic and/or other binder elements. Viscosity, defoaming, surface tension adjusting additives; antimicrobial additives; and water as needed to adjust viscosity, solid level or other properties. It should be made clear that the microencapsulated PCM may be introduced in the form of a dry solid, or a cake or concentrate with water remaining from the microencapsulation process. In some embodiments, the PCM slurry includes the composition shown in Table A which provides enhanced adhesion of the PCM to the base layer 20, as compared to existing surface coatings.

TABLE A

| Component | Percentage |
| --- | --- |
| ENFINIT ® 28 CSSH-1 | 50 |
| Water | 5 |
| ROVENE ® 97982 | 25 |
| ROVENE ® 9423 | 7.5 |
| TUFCOR ® 3220 | 12.5 |
| Total | 100.0 |

In some embodiments, the PCM slurry includes the composition shown in Table B, which provides increased flexibility to the surface coating 32, as compared to existing surface coatings.

TABLE B

| Component | Percentage |
| --- | --- |
| ENFINIT ® 28 CSSH-1 | 54 |
| Water | 9.4 |
| ROVENE ® 97982 | 36.3 |
| Total | 100.0 |

In the examples above, ENFINIT® 28 CSSH-1 is commercially available from Encapsys, LLC of Appleton, WI and is a PCM concentrate containing 53% microencapsulated phase change material with a 28 degree C. melt point. Before being commercialized, this same product was known experimentally as CP2005 Slurry. ROVENE® 97982 is an acrylic latex binder also commercially available from Mallard Creek Polymers of Charlotte, NC. ROVENE® 9423 is a carboxylated styrene-butadiene latex binder provided by Mallard Creek Polymers. TUFCOR® 3220 is a vinyl acetate/ethylene copolymer binder commercially available from Celanese of Dallas, TX.

In some embodiments, the phase change material used in the support cushions of the present embodiments undergoes its phase change at a temperature of about 20° C. to about 36° C. Of course, other phase change materials can also be used in the surface coatings of the present embodiments to provide an amount of cooling and can be configured to undergo a phase change at alternative temperature ranges depending on the particular intended use of the support cushion. In some embodiments, however, to further improve the cooling effect, one or more of the plurality of surface coatings can also include additional additives that have a higher thermal conductivity than the base layer 20.

Additionally or alternatively, in some embodiments, the surface coating 32 includes a gel. In one embodiment, the gel includes a urethane gel, such as, for example, a 2K urethane gel, wherein 2K should be understood to be a two component mixture. In another embodiment, the 2K urethane gel includes the composition shown in Table C. In a further embodiment, the gel is provided as a liquid precursor including isocyanate and a polyol that are combined immediately before being applied and that cure upon application to the support cushion 10.

TABLE C

| Component |
| --- |
| LU1046 Polyol Side (10 min Gel Time) |
| LP5613 MDI Side |

The LU1046 and LP5613 are commercially available from Dow Chemical Company.

In some embodiments, the microencapsulated PCM may have a core that is defined by a paraffin wax component which has a melting point in close proximity to human skin temperature. The paraffin wax may be covered by a protective polymer.

As discovered by the instant inventors, the 2K urethane gel may surprisingly be mixed with the PCM, including but not limited to PCM slurry, to form a combined system without excessive foaming and/or loss of properties. Accordingly, in some embodiments, the surface coating 32 including the PCM and the gel may be applied to the upper surface 24 of the base layer 20 in a single step process. For example, in one embodiment, a mixture of the PCM slurry and the gel is spray applied to the upper surface 24, forming the surface coating 32 in a single step. In another embodiment, the gel is added in situ at a mix chamber of the spray device to form the combined PCM/gel system for application through a spray nozzle. In some embodiments, the individual components of PCM slurry and 2K gel may be applied as individual layers which will react and polymerize upon being sprayed on the surface of base layer 20.

The PCM slurry and the gel may be mixed at any suitable concentration to provide the desired coating properties. In some embodiments, the surface coating may be, by weight, about 10-40% Gel and about 60-90% PCM slurry (as applied). Another suitable system includes, by weight, 85% PCM slurry (Table A) with 15% of a 2K urethane gel (Table C) which is metered premixed to the mix chamber as a combined system. However, as will be understood by those skilled in the art, the particular components included in the surface coating 32 as well as the particular ratios of each component can vary depending on the desired properties of the resulting surface coating. Thus the system may include the PCM slurry in Table B as well. Furthermore, the surface coating can be comprised of a unique combination of components and/or ratios without departing from the spirit and scope of the present embodiments.

As mentioned above, the surface coating 32 is configured to allow air to flow through the surface coating 32 and the base layer 20 (as illustrated in FIG. 1). In this regard, when applying the surface coating 32 to the base layer 20, it is generally the case that the cell structure of the base layer 20 will remain visible on the surface of the base layer 20 (i.e., the surface coating will not completely cover the cell structure of the underlying foam), such that airflow through the base layer 20 and through the surface coating 32 can be maintained in order to maintain and/or improve heat transfer away from the upper surface 24 of the base layer 20 and provide a cooling effect at the support surface 12 of the support cushion 10. Some level of porosity is maintained.

For example, in some embodiments, the surface coating 32 is formed with a thickness of less than 5 mm. In other embodiments, the thickness of the surface coating 32 may be increased to provide higher thermal effusivity of the support cushion, which, in turn, can provide for a longer lasting cooling effect in a variety of different types and configurations of support cushions. More specifically, increasing the thickness of the surface coating 32 increases the total amount of gel, which increases the thermal mass of the support cushion, and also increases the total amount of PCM, both of which provide higher thermal effusivity of the support cushion. Accordingly, in some embodiments, the application of phase change material can be increased from about 20 to about 200 grams/square foot, and the thermal mass can also be increased by increasing the amount of the reactive gel layer (which is typically in the range of 20 to 80 grams/square foot). Both increases provide a higher thermal effusivity which allows for a cooler feeling longer at the point of contact between the user and the various support cushions.

With respect to the support cushions of the present embodiments, it is contemplated that the support cushions described above can be in the form of pillows, mattresses, seat cushions, seat backs, neck pillows, leg spacer pillows, mattress toppers, overlays, and the like. As such, the phrase "support cushion" is used herein to refer to any and all such objects having any size and shape, and that are capable of or are generally used to support the body of a user or a portion thereof.

Figure 2:
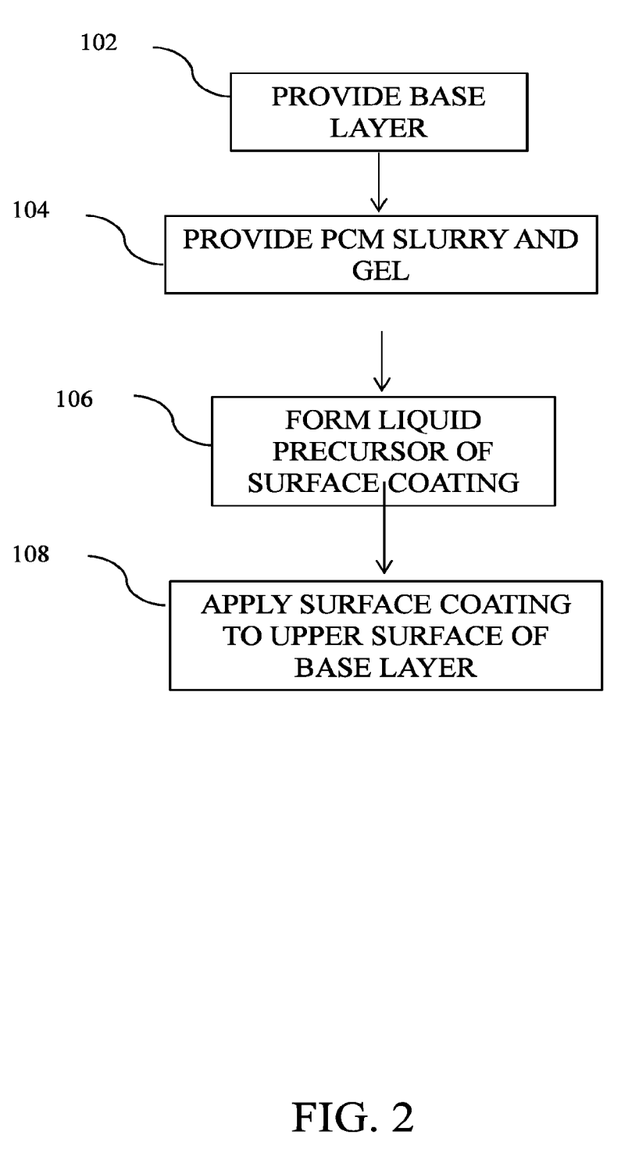
FIG. 2 is a flowchart showing an exemplary implementation of a method of producing a support cushion in accordance with the present embodiments.

Regardless of the particular form of the support cushion of the present embodiments, each of the exemplary support cushions described herein can also be produced by an exemplary implementation of a method for producing a support cushion in accordance with the present embodiments. Referring now to FIG. 2, in one exemplary implementation of a method for producing a support cushion, like the support cushion 10 described above, a base layer of foam is first provided, as indicated by step 102. As described above, the base layer typically has a lower surface and an upper surface and is comprised of a material that is porous and allows air to flow through the base layer.

Referring still to FIG. 2, upon providing the base layer, a surface coating is then applied to the upper surface of the base layer, as indicated by step 108. Prior to applying the surface coating, a PCM slurry and a gel are provided, as indicated in step 104, then mixed in situ to form a liquid precursor of the surface coating, as indicated in step 106.

After dispensing the liquid including the amount of phase change material onto the upper surface of the base layer, an air knife may be applied to the coating. As would be recognized by one skilled in the art, an air knife provides a laminar flow of pressurized air that is drawn across the coating to remove excess material. In at least some embodiments, instead of or in addition to removing excess precursor, the air knife can also be used to drive at least a portion of the liquid precursor into the base layer itself. Additionally or alternatively, the material may be mechanically pressed into the surface after spray deposition to allow for higher loading. Furthermore, in certain embodiments, if the substrate is a molded item, the material can be scuffed either across the entire application surface or in zones that allow for different adsorption of the material. Of course, in some implementations, the liquid precursor can also be dispensed in such a way that the air knife is not necessary at all.

Figure 3:
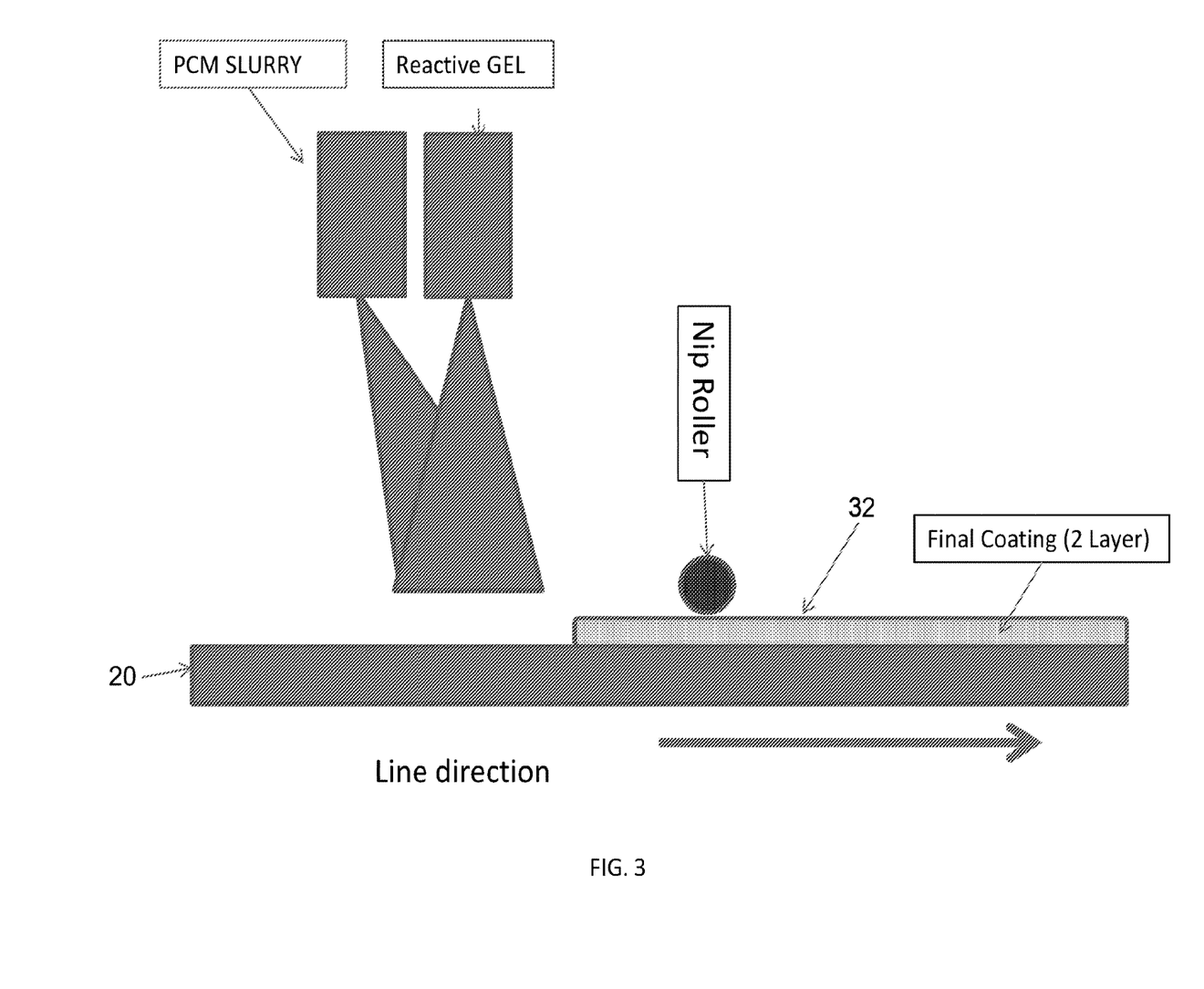
FIG. 3 is a schematic view of one embodiment of a process for applying one type of surface coating to a support cushion base layer.

As noted previously, it is also within the scope of the present embodiments that the surface coating 32 may be defined by two or more different layers. With reference to FIG. 3, in some embodiments, a foam base layer 20 may be sprayed with a premixed surface coating 32 or may be sprayed as individual components of the surface coating 32 wherein the spray nozzles may all be directed to a single location, or where the nozzles are directed to distinct locations for forming layers. Likewise, and for non-limiting example, these may also be applied with a roller for example.

In either manner of application, the surface coating may be applied as a first PCM layer (for nonlimiting example PCM slurry) on the base layer 20. Next, the reactive gel may be applied adjacent to the first PCM layer. In this embodiment, there may be two individual layers applied to the base layer 20 and the PCM and reactive gel layers. Further, a nip roller or other device may be provided to force or drive the PCM slurry and reactive gel into the base layer 20.

Figure 4:
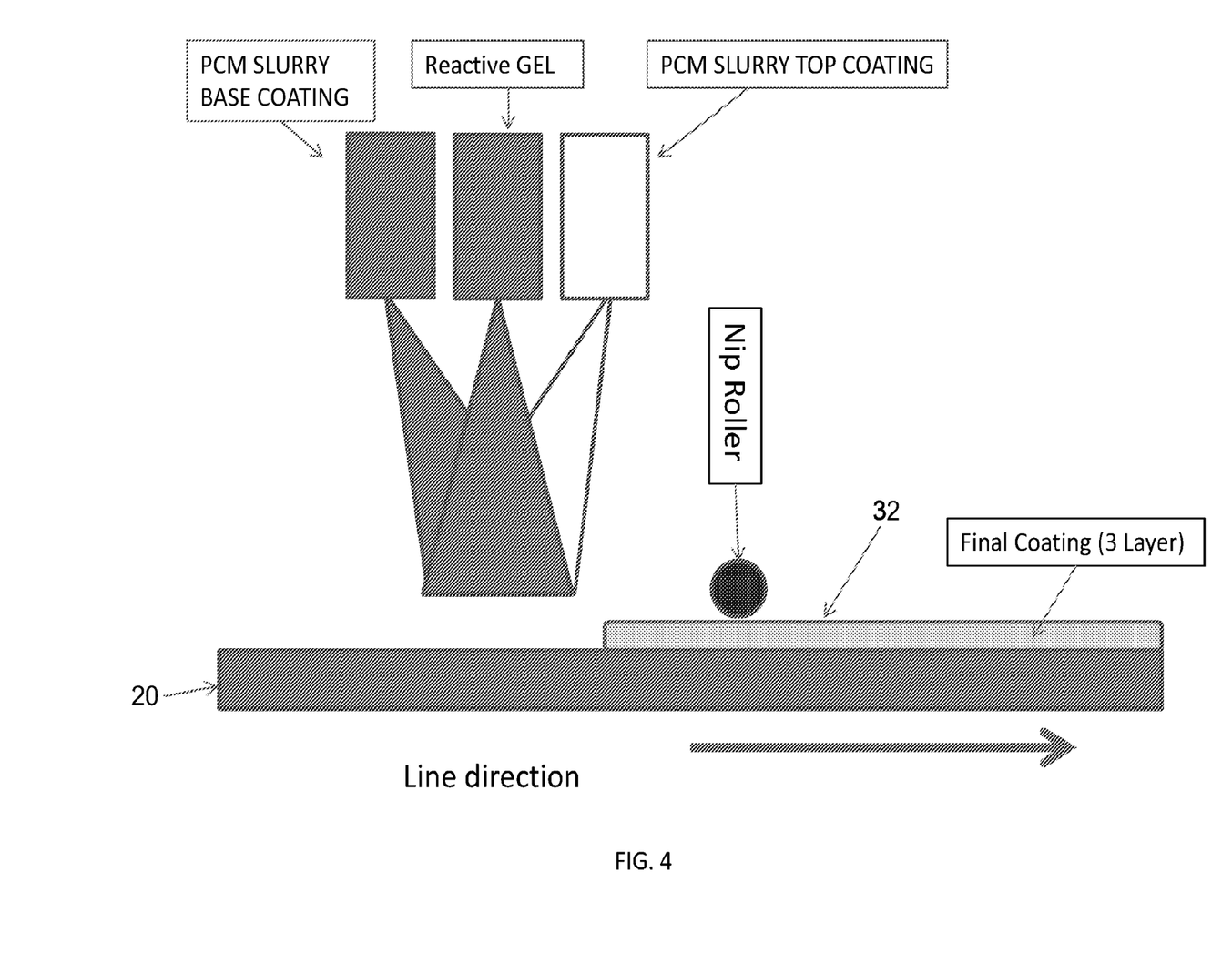
FIG. 4 is a schematic view of an alternate embodiment of a process for applying an alternate surface coating to a support cushion base layer.

In further embodiments, and with reference to FIG. 4, a further embodiment is provided wherein a three layer arrangement is provided. In this embodiment, the first PCM layer may be applied to the base layer 20. Next, a second layer comprising the reactive gel layer is applied as with the embodiment of FIG. 3. Further still however, an additional layer of PCM (for non-limiting example PCM slurry) may be applied on the gel reactive layer. The second PCM layer (uppermost layer of the surface coating) may be the same amount as the lower layer beneath the reactive gel, or may be a different amount. For example an upper most layer of the PCM slurry while the lower layer immediately beneath, may have a different amount, in order to aid in heat removal from the user. Additionally, it should be understood that the nozzles may be directed to separate locations or may be aimed to a single location as depicted, in either of the 2 layer or 3 layer embodiments, where the PCM slurry and reactive gel are not premixed. Further, there may be further embodiments where additional layers are provided.

Still further, it should be understood as well that where multiple layers of foam are sued to define the base layer 20, the different layers of the foam may also have the surface coatings 32 in any of the configurations and applied in any of the manners discussed herein. Additionally, or alternatively, the layer below the uppermost layer of foam, or subsequent layers beneath, may also utilized convolute foam, which may have a non-planar surface to increase airflow in the area of the planar foam above and therefore also aid to remove heat and increase the functionality of the surface coating.

EXAMPLES

It should be understood that various examples may be provided as illustrative and non-limiting. In some embodiments, for example, the PCM slurry may have multiple formulas and configurations. The following percentages are by weight.

| Component | Formula 1 | Formula 2 | Formula 3 |
| --- | --- | --- | --- |
| ENFINIT ® 28 CSSH-1 | 80-95% | 45-55% | 50-60% |
| Water | 5-20% | 1-9% | 6-12% |
| ROVENE ® 97982 | | 20-30% | 30-40% |
| ROVENE ® 9423 | | 5-9% | |
| TUFCOR ® 3220 | | 10-15% | |
| Total | 100.0% | 100.0% | 100.0% |

In these embodiments, the various components and ranges may be provided all of which may provide a suitable PCM slurry. The ROVENE® products are commercially available from Mallard Creek Polymers of Charlotte, NC. Additives may also be utilized as need to modify rheology, surface tension, enhance microbial resistance, or achieve another property adjustment.

An additional example of a suitable two component (2K) reactive gel is also provided. The gel may comprise the following percentages of components, by weight.

| Component | |
|---|---|
| LU1046 Polyol Side (10 min Gel Time) | 50-80% |
| LP5613 MDI Side | 20-50% |
| Total | 100% |

The LU1046 and LP5613 are commercially available from Dow Chemical Company.

Further examples are provided, one for each of the one layer application and the three layer application.

| EXAMPLES OF ONE LAYER APPLICATION | | | |
|---|---|---|---|
| | % by weight | | |
| LU1046 Polyol Side (10 min Gel Time) | 7.5-20% | 7.5-20% | 7.5-20% |
| LP5613 MDI Side | 3-20% | 3-20% | 3-20% |
| PCM Slurry-Formula 1 | 60-90% | | |
| PCM Slurry-Formula 2 | | 60-90% | |
| PCM Slurry-Formula 3 | | | 60-90% |

In a further embodiment for a three layer application, any of the following embodiments may be utilized.

| EXAMPLES OF THREE LAYER APPLICATION | | | | |
|---|---|---|---|---|
| | | % by weight | | |
| LAYER 1 | PCM Slurry-FORMULA 1 | 0-80% | | |
| | PCM Slurry-FORMULA 2 | | 0-80% | |
| | PCM Slurry-FORMULA 3 | | | 0-80% |
| LAYER 2 | LAYER 2-2K Gel | 20-60% | 20-60% | 20-60% |
| LAYER 3 | PCM Slurry-FORMULA 1 | 0-40% | | |
| | PCM Slurry-FORMULA 2 | | 0-40% | |
| | PCM Slurry-FORMULA 3 | | | 0-40% |

In this embodiment, the amounts pertain to an amount for each of the three layers defining the surface coating. In some embodiments, for example, the first layer of PCM slurry may be about 45-50%, the 2K reactive gel may be between about 25-30% and the third layer of PCM slurry may be between about 20-27%.

One of ordinary skill in the art will recognize that additional embodiments are also possible without departing from the teachings of the present embodiments or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claims.

The invention claimed is:

1. A method of producing a support cushion, comprising the steps of:
providing a base layer having a lower surface and an upper surface;
providing a phase change material slurry and a polyurethane gel, the phase change material slurry including a phase change material and one or more binders;
mixing the phase change material slurry and the gel to form a combined system; and
applying the combined system to the upper surface of the base layer to form a surface coating, the surface coating allows an amount of air to flow through the base layer and the surface coating and provides a cooling effect.

2. The method of claim 1, wherein the step of applying the combined system comprises spray applying the combined system.

3. The method of claim 1, wherein the mixing of the phase change material slurry and the polyurethane gel is performed in situ at a mix chamber of a spray device prior to spray applying the combined system.

4. The method of claim 1, wherein the binders are selected from an acrylic latex binder, a carboxylated styrene-butadiene binder, a vinyl acetate/ethylene copolymer binder, and combinations thereof.

5. The method of claim 4, wherein the binders include an acrylic latex binder, a carboxylated styrene-butadiene binder, and a vinyl acetate/ethylene copolymer binder.

6. The method of claim 4, wherein the binders include an acrylic latex binder.

7. The method of claim 1, wherein the base layer is a flexible foam.

8. The method of claim 1, wherein the surface coating comprises, by weight, 80-90% phase change material slurry and 10-20% polyurethane gel.

9. The method of claim 1, wherein the polyurethane gel is a 2K polyurethane gel.

10. The method of claim 9, wherein the 2K polyurethane gel comprises a combination of an isocyanate and a polyol.

11. The method of claim 1, wherein the surface coating has a thickness of greater than 0 mm and less than about 5 mm.

12. The method of claim 1, wherein the phase change material undergoes a phase change at a temperature of about 20° C. to about 36° C.

13. The method of claim 1, wherein the surface coating is defined by a plurality of layers.

14. The method of claim 13, wherein the plurality of layers is two layers.

15. The support cushion of claim 13, wherein the plurality of layers is three or more layers.

* * * * *